United States Patent [19]
Cohen

[11] Patent Number: 5,183,208
[45] Date of Patent: Feb. 2, 1993

[54] DRIP IRRIGATION EMITTER

[75] Inventor: Amir Cohen, Yuvalim, Israel

[73] Assignee: Agroteam Consultants Ltd., Haemek, Israel

[21] Appl. No.: 729,953

[22] Filed: Jul. 15, 1991

[30] Foreign Application Priority Data

Jul. 20, 1990 [IL] Israel ........................................ 95138
Oct. 29, 1990 [IL] Israel ........................................ 96164

[51] Int. Cl.⁵ .................................................. B05B 15/00
[52] U.S. Cl. ................................................................ 239/542
[58] Field of Search ...................... 239/542; 138/42, 43, 138/46

[56] References Cited

U.S. PATENT DOCUMENTS 3,998,427 12/1976 Bentley ................................. 239/542
4,533,083 8/1985 Tucker ................................... 239/542
4,573,640 3/1986 Mehoudar.............................. 239/542
4,817,875 4/1989 Karmeli et al. ....................... 239/542

FOREIGN PATENT DOCUMENTS

2366790 5/1978 France .
2469959 5/1981 France .
8300003 1/1983 World Int. Prop. O. .......... 239/542

Primary Examiner—Andres Kashnikow
Assistant Examiner—Lesley D. Morris
Attorney, Agent, or Firm—Benjamin J. Barish

[57] ABSTRACT

A drip irrigation emitter includes an elastomeric member fixed within a housing and defining, with an internal surface thereof, at least a part of a flow-reducer passageway. The elastomeric member is embossed with an integrally formed relief formation on the surface thereof facing the internal surface of the housing to space it from the internal surface and to permit the enlargement or reduction of the flow-reducer passageway upon the deformation of the elastomeric member in response to the flow.

16 Claims, 6 Drawing Sheets

DRIP IRRIGATION EMITTER

FIELD AND BACKGROUND OF THE INVENTION

The present invention relates to drip irrigation emitters and to drip irrigation lines of the type including a continuous tube having a plurality of emitters spaced longitudinally along its length.

Drip irrigation lines of the foregoing type are gaining widespread use because of their efficiency in the delivery of irrigating water directly to the plant roots, and their substantial savings in the irrigation water required. Such drip irrigation lines generally comprise a tube having a plurality of discharge ports spaced along its length, and a flow-reducer emitters fixed to the tube at each of the discharge ports. In the flow-regulated irrigation line, each of the emitter includes a rigid plastic member and an elastomeric member fixed to the rigid plastic member and therewith a flow-reducing passageway communicating with its respective discharge port, which passageway is automatically enlarged or restricted by the deformation of the elastomeric member in response to flow.

The elastomeric member, in the conventional emitter, is usually in the form of a planar diaphragm, and the rigid plastic member is usually formed with embossments cooperable with the planar diaphragm to define the enlargeable/restrictable flow-reducing passageway regulating the flow to the discharge port. Such a construction has been found to have a number of drawbacks to be referred to below.

OBJECTS AND BRIEF SUMMARY OF THE INVENTION

An object of the present invention is to provide a drip irrigation emitter for a drip irrigation line of the foregoing type but modified to produce a number of important advantages as will be described more particularly below.

According to the present invention, there is provided a drip irrigation emitter comprising a housing including an inlet connectible to a source of pressurized water, an outlet for discharging the water from the housing, a flow-reducer passageway between the inlet and outlet for reducing the flow of water discharged through the outlet, and an elastomeric member fixed within the housing and defining, with an internal surface thereof, at least a part of the flow-reducer passageway which part is automatically enlarged or restricted by deformation of the elastomeric member in response to flow through the at least part of the flow reducer passageway; characterized in that the elastomeric member is embossed with an integrally formed relief formation on the surface thereof facing the internal surface of the housing to space same from the internal surface and to permit the enlargement or reduction of the at least part of the flow-reducer passageway upon the deformation of the elastomeric member in response to the flow.

It has been found that such a construction provides a number of advantages over the conventional construction. Thus, by providing a shaped or embossed elastomeric member, as distinguished from a planar elastomeric member, it has been found that there is less strain in the elastomeric member during the normal operation of the drip irrigation line, thereby substantially extending the useful life of the line. In addition, by embossing the elastomeric member to define the flow-reducing passageway, a greater proportion of the surface of the flow-reducing passageway is constituted of elastomeric (as distinguished from rigid) material, thereby decreasing the sensitivity of the flow-reducing passageway to clogging. A still further advantage in the novel construction is that flow-reducer elements including embossed elastomeric members are less expensive to manufacture in volume and at low cost, and simpler to produce and to assemble.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
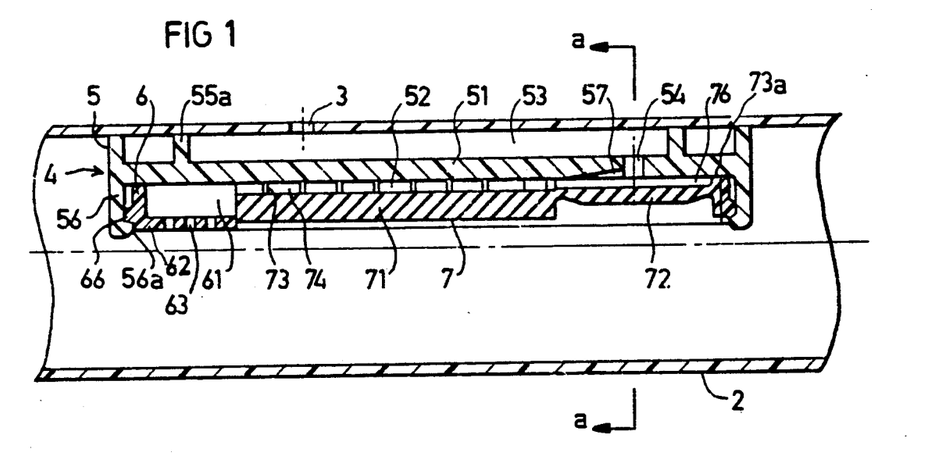
FIG. 1 is a partial longitudinal sectional view of one form of drip irrigation line constructed in accordance with the present invention, FIG. 1a being a transverse section along line a—a of FIG. 1.
Figure 1A:
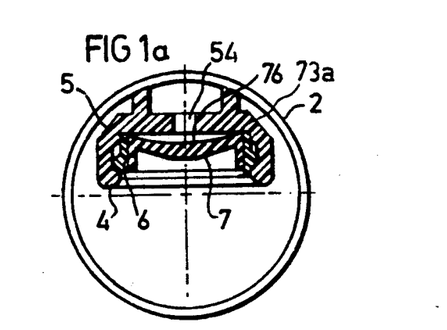
Figure 2:
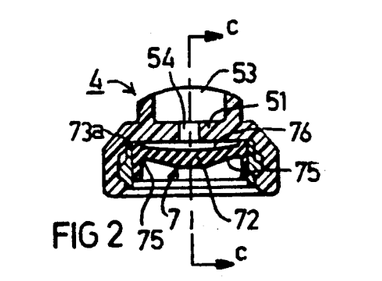
FIG. 2 is a sectional view corresponding to FIG. 1a but illustrating only the flow-reducer element in the drip irrigation line of FIG. 1.
Figure 2A:
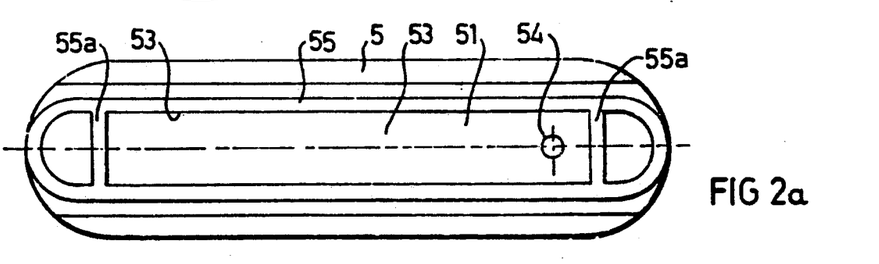
FIGS. 2a and 2b are top and bottom views, respectively, of the modified flow-reducer element of FIG. 2, and FIGS. 2c and 2d are sectional views along lines c—c of FIG. 2 and d—d of FIG. 2c, respectively.
Figure 2B:
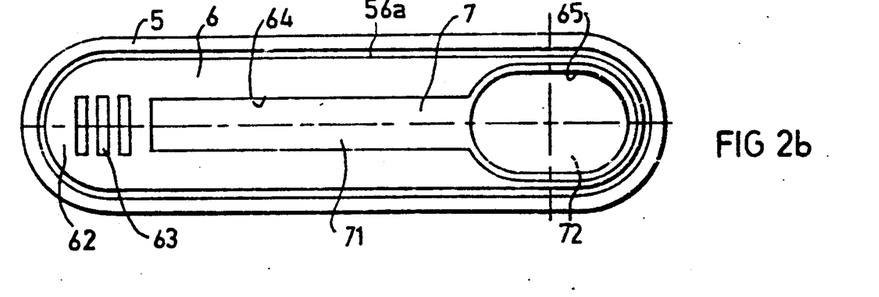
Figure 2C:
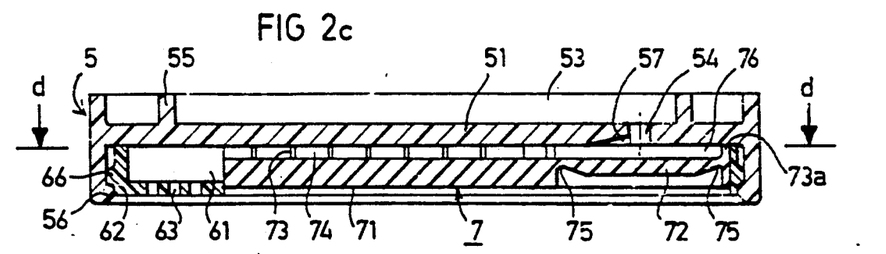
Figure 2D:
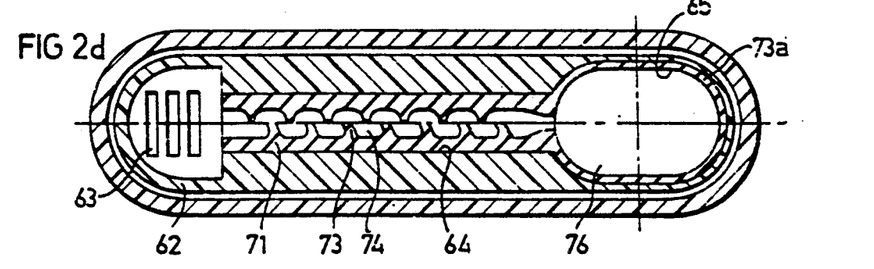

The drip irrigation line illustrated in FIGS. 1-2d comprises a tube 2 having a plurality of discharge ports 3 spaced along its length, and a flow-reducer element, generally designated 4, fixed to the inner face of the tube at each of the discharge ports. Each of the flow-reducer elements 4 includes a rigid plastic body constituted of an outer rigid plastic section 5 and an inner rigid plastic section 6; and an elastomeric member 7 fixed within the inner rigid plastic section 6 to define a passageway leading from the interior of the tube 2 to its respective discharge port 3 for reducing the flow through the discharge port. This passageway is automatically enlarged or restricted by the deformation of the elastomeric member 7 in response to the pressure on the opposite faces of the elastomeric member, which in turn is responsive to the flow through the passageway (or pressure within the tube), thereby regulating the flow through the passageway.

The outer section 5 of the rigid plastic member 4 is of elongated, generally rectangular configuration having semi-circular ends, and extends for only a fraction of the total circumference of the water supply tube 2. It includes a central partition 51 dividing its interior into an inner elongated cavity 52 and an outer elongated cavity 53. Partition 51 is further formed with an opening 54 at one end, constituting the outlet end of the flow-reducer element, establishing communication between the two cavities 52 and 53. When the flow-reducer element is secured to the inner face of the tube 2, cavity 53 is closed by the inner face of the tube and defines an outlet chamber to the discharge port 3 in the tube.

The outer cavity 53 is circumscribed by a peripheral rib 55 and two transverse end ribs 55a which space partition 51 from the inner face of the tube 2. The inner cavity 52 is circumscribed by a peripheral skirt 56 formed on its inner edge with an inwardly-extending rib 56a for receiving, with a snap fit, the inner rigid section 6 of the plastic member. The outer section 5 is further formed with a slot 57 on its inner face adjacent to, and communicating with, its outlet opening 54 through partition 51.

The inner rigid section 6 is of the same outer configuration as the inner cavity 52 of the outer rigid section 5. At one end, constituting the inlet end of the flow-reducer element, section 6 includes a cavity 61 closed by a semi-circular wall 62 formed with a plurality of rectangular openings 63, constituting the inlet openings to the flow-reducer element. The inner section 6 is further formed with an elongated slot 64 extending from the inlet end of the flow-reducer element and terminating in an enlarged oblong opening 65 at its opposite end. The inner section 6 is further formed with a rib 66 around its outer periphery enabling the section to be snap-fitted into the outer section 5 by engagement with rib 56a of the outer section.

The elastomeric element 7 has an outer configuration corresponding to slot 64 and oval opening 65 in the inner section 6 of the flow-reducer element. Thus, elastomeric member 7 includes an elongated section 71 fitted within slot 64 of the inner plastic section 6, and an oval section 72 at the end fitted within oval opening 65 of the plastic section 6. As shown particularly in FIGS. 1 and 2c, the outer face of elastomeric section 71 is planar, but its inner face (i.e., facing the inner face of partition wall 51 in plastic section 5) is embossed with an integrally formed relief formation in the form of ribs 73 in section 71, and an annular rib 73a around section 72. Ribs 73 define, with the inner face of partition 51, a flow-reducing passageway or labyrinth 74 between the inlet openings 63 of the flow-reducer element, and the outlet opening 54 leading to the discharge port 3 (FIG. 1) via the outlet chamber 53.

As shown particularly in FIGS. 1 and 2c, the oval section 72 of the elastomeric member 7 is of reduced thickness for its complete area, as compared to the thickness of its section 71. In addition, the juncture 75 of section 72 with section 71 is further reduced in thickness so as to increase the flexibility of section 72 of the elastomeric member. Further, the inner face of section 72 of the elastomeric member is spaced from the inner face of partition 51 by the embossed ribs 73 defining the labyrinth 74, and by annular embossed rib 73a formed around section 72 on the inner face of the elastomeric member, to thereby define a control chamber 76 in alignment with the outlet opening 54 in partition wall 51 of the rigid plastic section 5.

The flow-reducer element illustrated in FIGS. 1–2d, operates as follows: Water from the interior of tube (e.g., 2) flows through inlet openings 63 (e.g., FIGS. 2b, 2c), into the flow-reducing passageway 74 defined by the embossed ribs 73 of the elastomeric member 7, then to the control chamber 76 defined by section 72 of the elastomeric member, through outlet opening 54 in partition 51 of the rigid plastic section 5, through outlet chamber 53, and out through the respective discharge port 3. This extended flowpath for the water reduces the pressure of the water flowing through this path so that it exits from the discharge port 3 at substantially atmospheric pressure in the form of a slow trickle or dripping.

If the flow rate through passageway 74 and control chamber 76 rises, e.g., because of an increase in the inlet pressure, this will reduce the pressure in passageway 74, and particularly in control chamber 76, causing the elastomeric member to deform in the direction of restricting this passageway and control chamber, thereby restricting the outlet flow; similarly, if the flow rate through this passageway and control chamber drops, this will increase the pressure on the elastomeric member 7 tending to enlarge this passageway and control chamber, thereby increasing the flow rate. Accordingly, the illustrated flow reducer element is self-regulating, tending to maintain a substantially constant discharge rate irrespective of variations in the inlet pressure, terrain, etc.

As indicated earlier, the inner face of partition 51 is formed with a slot 57 (FIG. 2c) communicating with the outlet opening 54. This has been found to be very desirable in order to maintain communication between the flow passageway 74 and the outlet opening 54 even under high inlet pressures.

Figure 3A:
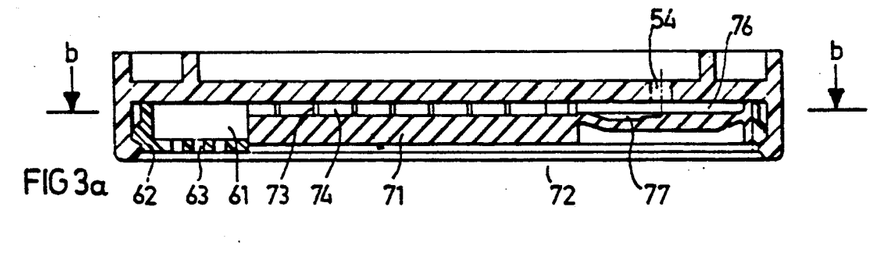
FIGS. 3a and 3b are views, corresponding to FIGS. 2c and 2d, respectively, illustrating a modification in the construction of the flow-reducer element.
Figure 3B:
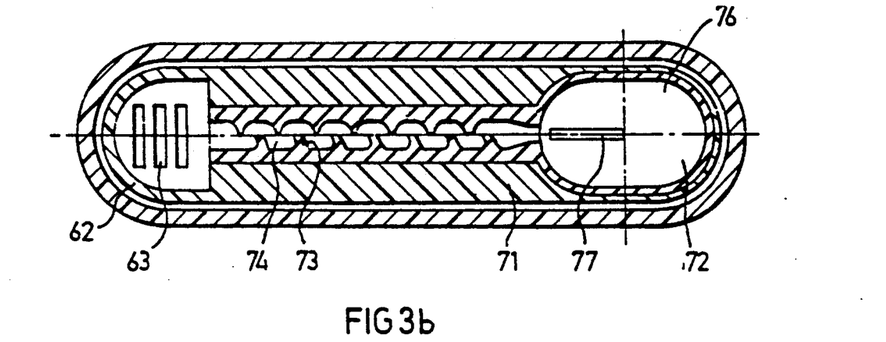

The flow-reducer element illustrated in FIGS. 3a and 3b is similarly constructed as described above, except that the slot, corresponding to slot 57 illustrated in FIG. 2c, is formed, not in the rigid plastic section of the flow-reducer element, but rather in the elastomeric element 7. Thus, as shown in FIGS. 3a and 3b, the inner face of section 72 of the elastomeric element 7 is formed with a slot 77 starting at one end of that section and terminating at the outlet opening 54, to thereby maintain communication between the control chamber 76 and the outlet opening 54 under all pressure conditions. In all other respects, the flow-reducer element illustrated in FIGS. 3a and 3b is constructed and operates in the same manner as described above.

Figure 4:
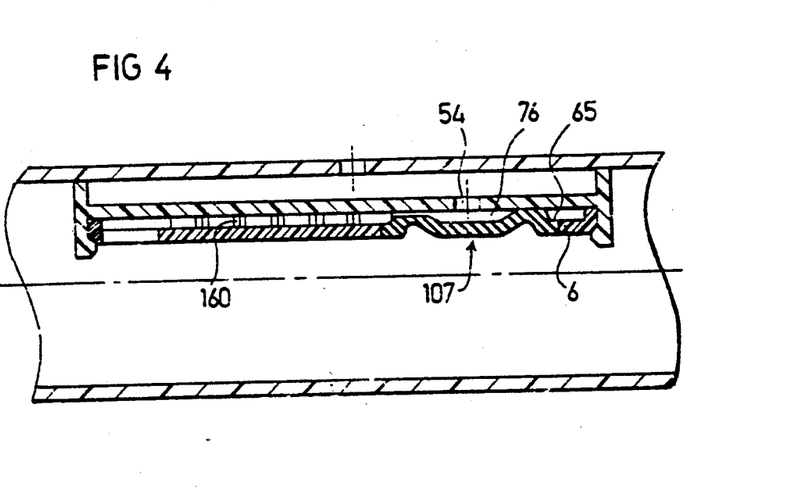
FIG. 4 is a view corresponding to that of FIG. 1 but illustrating a modification in the construction of the flow-reducer element.

FIG. 4 illustrates another construction, also generally similar to those described above, except here the elastomeric element, generally designated 107, extends only within the oval cavity 65 formed in the inner rigid section 6. Thus, the deformable elastomeric member 107 is effective only with respect to the control chamber 76 for regulating the outlet flow through the outlet opening 54. The elastomeric member is not formed with the elongated section 71 including the labyrinth-forming ribs 73, but rather the inner plastic section 6 is formed with the labyrinth-forming ribs, as shown at 160 in FIG. 4. The flow-reducer element illustrated in FIG. 4 is otherwise constructed and operates in the same manner as described above, except that here the flow-regulation is effected only in the control chamber 76 by the deformation of the elastomeric member 107.

Figure 5:
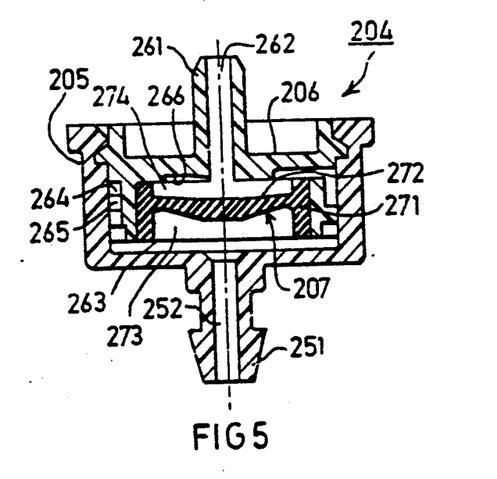
FIG. 5 is a sectional view illustrating a further form of flow-reducer element constructed in accordance with the present invention.

FIG. 5 illustrates another type of flow-reducer element, generally designated 204, including a rigid plastic housing constituted of an outer rigid section 205 and an inner rigid section 206, and an embossed elastomeric member 207 which is deformable in response to the pressure on its opposite faces to regulate the flow through the element. In this case, the outer rigid section 205 is formed with a nipple 251, having an opening 252 therethrough, insertable into the respective discharge port of the tube (not shown) such that the opening 252 constitutes the inlet opening from the tube into the flow-reducer element. The rigid inner section 206 is also formed with a nipple 261 having an opening 262 therethrough, such that opening 262 serves as the outlet opening from the flow-reducer element.

The inner rigid section 206 is further formed with a cavity 263 coaxial with both nipples 251 and 261 and the respective openings 252, 262. Cavity 263 is of cylindrical configuration, and the elastomeric member 207 is embossed with an integrally formed relief formation in the form of a cylindrical wall 271 fixed within cylindrical cavity 263, and with an elastomeric partition wall 272. One side of elastomeric partition wall 272 defines an inlet control chamber 273 with the outer rigid section 205 coaxial with the inlet opening 252 passing through nipple 251. The opposite side of elastomeric partition wall 272 defines an outlet control chamber 274 with the inner rigid section 206 coaxial with the outlet opening 262 through nipple 261.

In addition, the outer face of the inner rigid section 206 is further formed with ribs 264 defining, with the inner face of the outer rigid section 205, a flow-reducing passageway or labyrinth 265 communicating, at one end, with the inlet control chamber 273, and at the opposite end with the outlet control chamber 274. The outlet control chamber 274 is expansible and contractible by the deformation of the partition wall 272 of the elastomeric member 207 to regulate the flow through it and out through the outlet opening 262 in response to flow.

Accordingly, the water inletted from the water supply tube (not shown) via inlet opening 252 through nipple 251 flows through the inlet control chamber 273, the passageway 265 between the outer face of the inner rigid section 206 and the inner face of the outer rigid section 205, the outlet control chamber 274, and out through the outlet opening 262 in nipple 261. Any increase in the rate of flow reduces the pressure in the outlet control chamber 274, thereby causing the elastomeric partition wall 272 to deform inwardly, contracting the chamber, and thereby reducing the flow rate. Thus, in the embodiment illustrated in FIG. 5, the regulation is effected only in the outlet control chamber 274, as in the embodiment of FIG. 4.

In order to assure continuity of flow through the outlet opening 262 even high under high pressure conditions, the inner face of the inner rigid section 206, defining one side of the control chamber 274, is formed with a slot 266 extending to the outlet opening 262.

Figure 6:
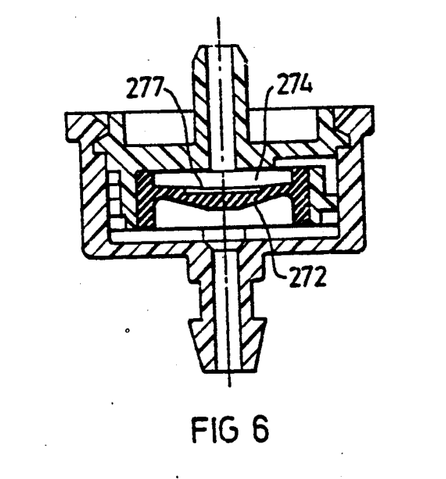
FIG. 6 illustrates a modification in the construction of the flow-reducer element of FIG. 5.

FIG. 6 illustrates a variation in the construction, wherein the slot (corresponding to 266 in FIG. 5), assuring continuity of flow under high pressure conditions, is formed in the surface of the elastomeric partition 272 within the control chamber 274, as shown at 277, analagous to the construction illustrated in FIGS. 3a and 3b. In all other respects, the flow-reducer element illustrated in FIG. 6 is constructed and operates in the same manner as the flow-reducer element 204 in FIG. 5.

Figure 7:
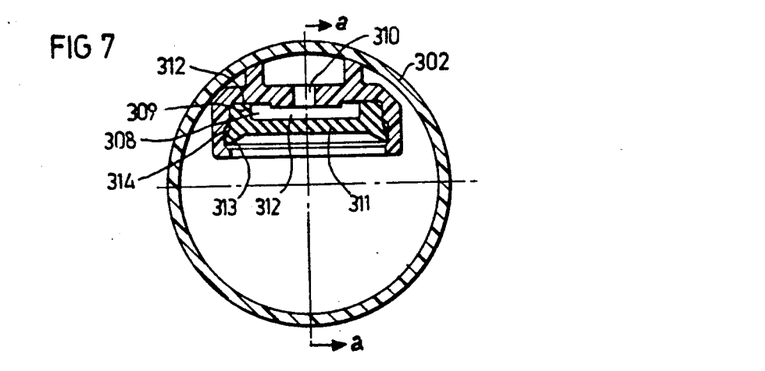
FIGS. 7 and 8 are transverse sectional views illustrating two forms of "integrated-tube" type drip irrigation emitter constructed in accordance with the present invention, FIGS. 7a and 8a being longitudinal sectional views along lines a—a of FIGS. 7 and 8, respectively.
Figure 7A:
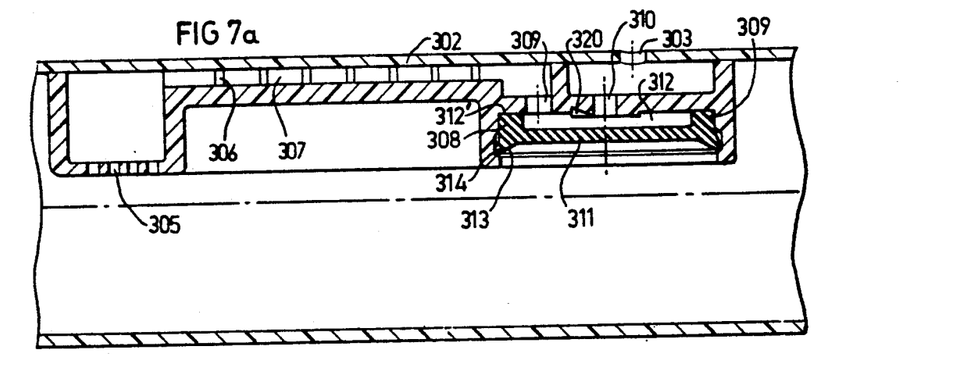

The drip irrigation emitter illustrated in FIGS. 7 and 7a is of the "integrated-tube" type, in that a plurality of such emitters are integrated in a water supply tube, generally designated 302, formed with a plurality of discharge ports 303 spaced along the length of the tube, with the outlet of each emitter communicating with a discharge port of the tube.

The emitter illustrated in FIGS. 7 and 7a includes a housing formed at one end with an inlet 305 to communicate with the interior of the water supply tube 302, and with a plurality of ribs 306 engageable with the inner face of the tube to define a labyrinth flowpath 307. At the outlet end of flowpath 307, the emitter housing is formed with a cavity 308 communicating with flowpath 307 via an opening 309, and also communicating with the discharge port 303 via an outlet opening 310. An embossed elastomeric member 311 is fixed within cylindrical cavity 308, and defines an outlet control chamber 312 communicating with the outlet opening 310. The opposite face of the elastomeric member 311 communicates with the interior of the water supply tube 302.

The elastomeric member 311 is embossed with an integrally formed relief formation in the form of with an annular rib 311a on its inner face, engageable with the flat inner face of wall 308a defining of cavity 308, to space the member from the inner face of the cavity and thereby to define the outlet control chamber 312. The opposite face of elastomeric member 311 is integrally formed with another annular rib 313 which is received within an annular recess 314 formed in that end of the cavity 308.

It will be seen that the pressure within the water supply tube 302 will be applied to rib 313 to deflect it firmly against the side wall of cavity 308, and thereby to seal the outlet control chamber from the interior of the water supply tube 302. For this purpose, annular rib 313 is of decreasing thickness towards it outer edge to increase its deformation and thereby to enhance the seal.

The operation of the emitter illustrated in FIGS. 7 and 7a will be apparent from the above description. Thus, the pressurized water within the water supply tube 302 flows from the inlet 305 through the labyrinth flowpath 307 and opening 309, the outlet control chamber 312, outlet 310 and out through the discharge port 303. The labyrinth flowpath 307 reduces the flow through the discharge port 303, and the embossed elastomeric member 311, by its deformation in response to the difference in pressure on its opposite faces, regulates the flow through the outlet 310 to the discharge port 303. Preferably, the that inner face of wall 308a defining the cylindrical cavity 308 is formed with a radial recess 320 to establish continuous communication with the outlet 310.

Figure 8:
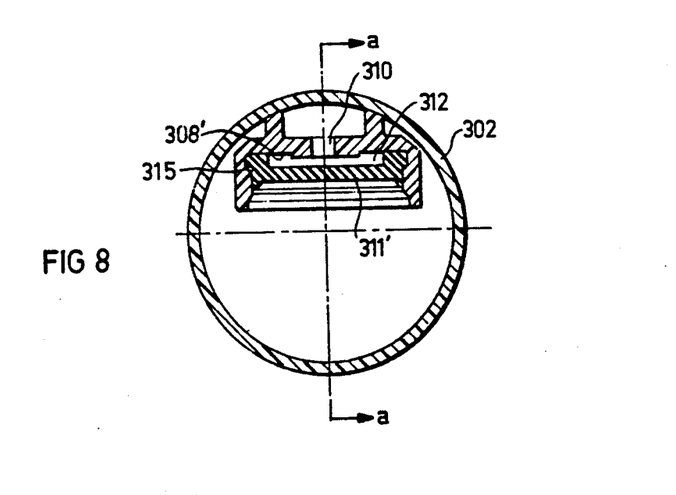
Figure 8A:
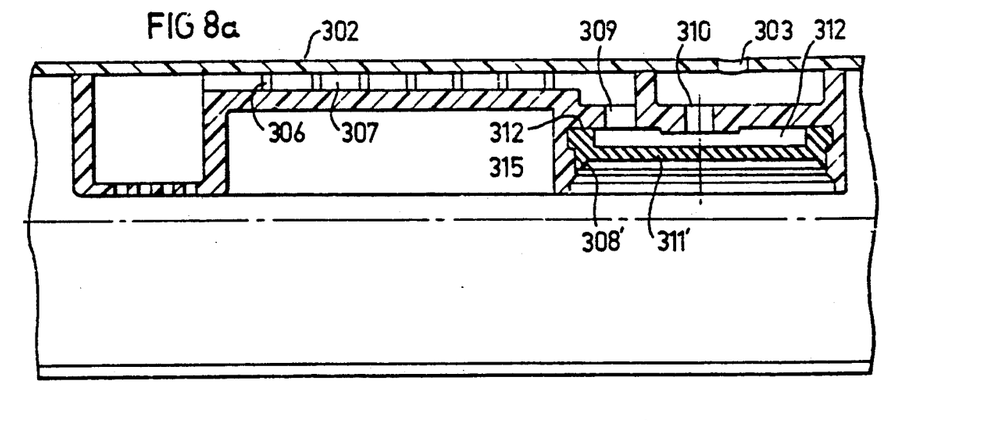

The integrated-tube type emitter illustrated in FIGS. 8 and 8a is substantially the same as described above with respect to FIGS. 7 and 7a, and therefore the parts have been correspondingly numbered to facilitate understanding. The only difference in the construction illustrated in FIGS. 8 and 8a is that the cavity, therein designated 308', receiving the embossed elastomeric member 311', is formed with an annular recess 315 on the side of the cavity facing the outlet control chamber 312 for stably fixing the member within the cavity and for producing the seal between the outlet control chamber 312 and the interior of the tube.

In all other respects, the construction and operation of the emitter illustrated in FIGS. 8 and 8a are the same as described above with respect to FIGS. 7 and 7a.

Figure 9:
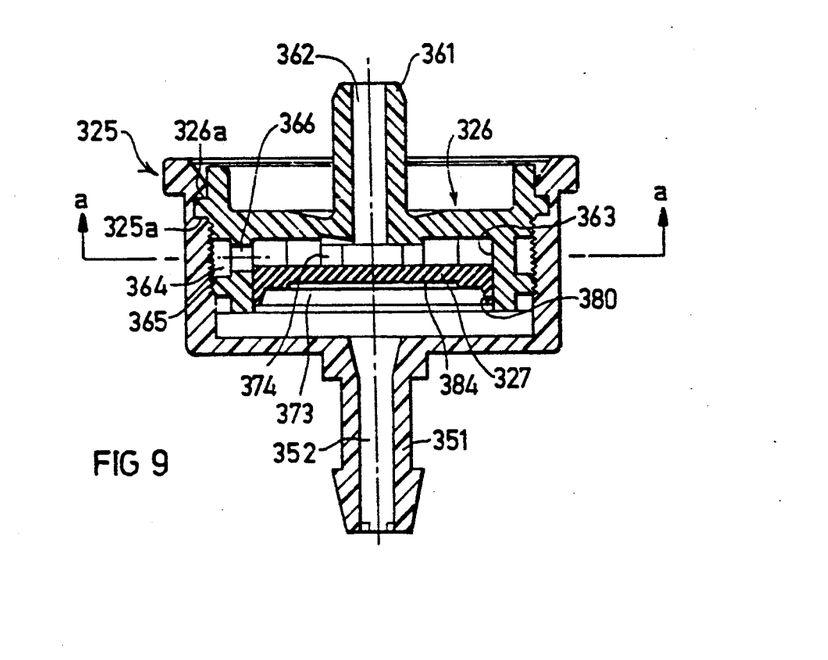
FIGS. 9 and 10 are longitudinal sectional views illustrating two forms of the "attachable" type drip irrigation emitter constructed in accordance with the present invention, FIGS. 9a and 10a being transverse sectional views along lines a—a of FIGS. 9 and 10, respectively.
Figure 10:
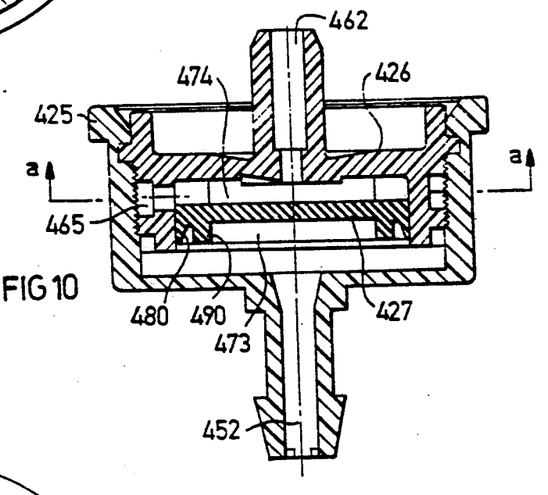

FIGS. 9 and 10 illustrate the invention as embodied in the "attached" type drip irrigation emitter which includes a nipple formed with the inlet of the emitter and insertable into the discharge port formed in the water supply tube.

Figure 9A:
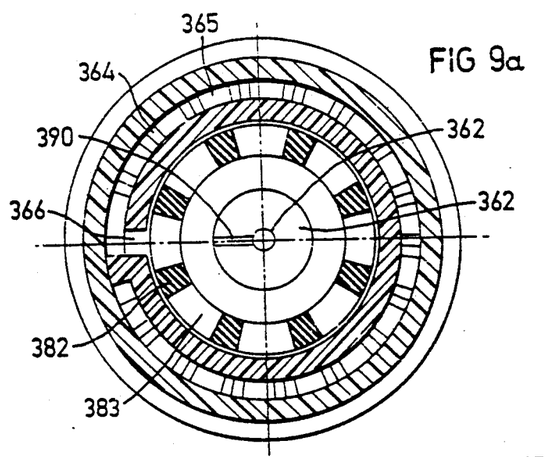

The drip irrigation emitter illustrated in FIGS. 9 and 9a includes a plastic housing constituted of an outer rigid section 325 and an inner rigid section 326. The emitter further includes an embossed elastomeric member 327 which is deformable in response to the pressure on its opposite faces to regulate the flow through the emitter. The outer housing section 325 is formed with a nipple 351, having an opening 352 therethrough, insertable into a discharge port of a water supply tube such that the opening 352 constitutes the inlet into the emitter. The housing inner section 326 is also formed with a nipple 361 having an opening 362 therethrough, constituting the outlet from the emitter. The two sections 325, 326 are assembled together, with the elastomeric member 327 between them, by snapping an annular bead 326a on the outer face of the side wall of section 326 into an annular recess 325a in the inner face of the side wall of section 325.

The inner housing section 326 is formed with an inner cylindrical cavity 363, and the outer face of section 326 is formed with ribs 364 defining, with the inner face of housing section 325, a labyrinth flowpath 365. This flowpath 365 communicates, at one end, via an inlet control chamber 373 within cavity 363 on one side of the elastomeric member 327, with the inlet 352. The opposite end of the labyrinth flowpath 365 communicates, via an opening 366, and the outlet control chamber 374 on the opposite side of the elastomeric member 327, with the outlet 362.

Elastomeric member 327 is embossed with integrally formed relief formations on its opposite faces.

Thus, on the face within the inlet control chamber 373, elastomeric member 327 is integrally formed with an annular rib 380 around its periphery engageable with the surface of housing section 326 defining the cavity 363 in order to seal the inner control chamber 373 from the outer control chamber 374. As clearly seen in FIG. 9, annular rib 380 is of decreasing thickness towards its outer edge, thereby increasing the deformability of this rib and enhancing the seal produced between its outer edge and the inner surface of housing section 326. In addition, the outer surface of rib 380 is spaced from the inner surface of housing section 325, so as to better permit the outer edge of the rib to deflect firmly against the side wall of the cavity in housing section 326 and thereby to further enhance the seal.

The relief formation on the opposite face of the embossed elastomeric member 327 comprises an annular array of projections 382 (FIG. 9a), extending axially and spaced circumferentially as shown at 383, around member 327. Projections 382 have flat outer faces and engage the underface of housing section 326 to define the outlet control chamber 374.

Elastomeric member 327 will thus be deformed towards and away from the mouth of outlet 362 in response to the difference in pressure in chambers 373 and 374. The deformability of the central part of the elastomeric member is increased by dishing its underface, as shown at 384. The underface of housing section 326 is formed with a radially-extending recess 390 to maintain communication between the outlet control chamber 374 and outlet 362 even under high inlet pressure conditions when the central dish portion 384 of the elastomeric member 327 may be pressed against the mouth of the outlet 362.

When the emitter of FIGS. 9 and 9a is applied to a discharge port of a water supply tube (not shown), by inserting nipple 351 into the water discharge port, pressurized water passes from the interior of the water supply tube via inlet 352 through the inlet control chamber 373, the labyrinth flowpath 365, opening 366, outlet control chamber 374, and out through the outlet 362. The central dish portion 384 of the elastomeric member 327 will be deformed towards or away from outlet 362 in response to the difference in pressure at its opposite sides facing the inlet control chamber 373 and outlet control chamber 374, respectively. Thus, if the flow through the outlet control chamber 374 is too high, this will decrease the pressure on that face of the elastomeric member 327, and will therefore cause it to deflect towards outlet 362, which will automatically reduce the flow rate; whereas if the flow rate is too low, this will increase the pressure within chamber 374 to deflect elastomeric member 327 away from outlet 362, thereby increasing the flow rate.

Figure 10A:
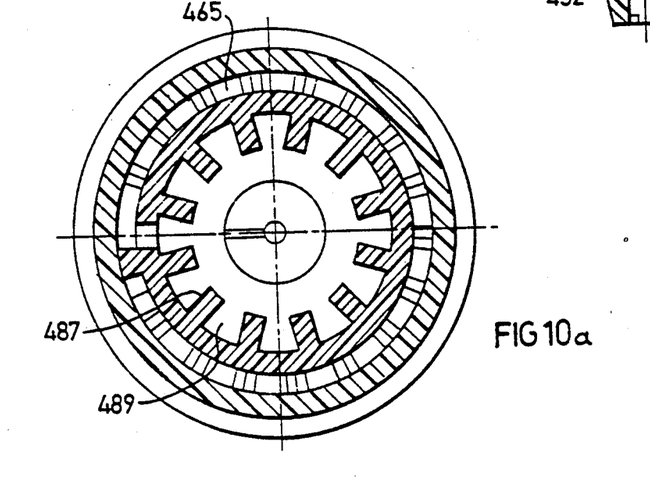

The emitter illustrated in FIGS. 10 and 10a is similarly constructed as in FIGS. 9 and 9a, with the following exceptions:

The embossed elastomeric member 427 clamped between the outer housing section 425 and inner housing section 426 is integrally formed on its underface with a second annular rib 490 coaxial with, and of smaller diameter than, the sealing annular rib 480. Annular rib 490 increases the physical strength of the embossed elastomeric member 427.

In addition, the opposite side of the elastomeric member 427 is not formed with the spacing projections (382, in FIGS. 9 and 9a), but rather the underface of housing section 426 is formed with these projections, as shown at 487. The projections are also disposed in an annular array and are circumferentially-spaced, to provide the spaces 489, in order to define the outlet control chamber 474 between the elastomeric member 427 and housing section 426.

In all other respects, the structure and operation of the emitter illustrated in FIGS. 10 and 10a are the same as described above with respect to FIGS. 9 and 9a. Thus, the deformation of the central part of the elastomeric member 427, in response to the difference in pressure in the inlet control chamber 473 and outlet control chamber 474, will automatically move the central part of the elastomeric member towards or away from the outlet 462 to maintain a relatively constant rate of flow of the water from the inlet 452, inlet control chamber 473, labyrinth flowpath 465, outlet control chamber 474, and outlet 462.

While the above drawings illustrate the emitter as extending for a small part of the circumference of the water supply tube, it will be appreciated that such emitters could extend for a major part or for the complete circumference of the water supply tube. Other variations and applications of the invention will be apparent.

What is claimed is:

1. A drip irrigation emitter comprising:
a housing including an inlet connectible to a source of pressurized water, an outlet for discharging the water from the housing, and a flow-reducer passageway between said inlet and outlet for reducing the flow of water discharged through the outlet;
said flow-reducer passageway including a labyrinth flow path communicating with said inlet, and an outlet control chamber between said labyrinth flow path and said outlet;

and an elastomeric member fixed within the housing and defining, with an internal surface thereof, a deformable wall of at least said outlet control chamber, which outlet control chamber is automatically enlarged or restricted by deformation of the elastomeric member in response to flow through said outlet control chamber;

said elastomeric member being embossed with an integrally formed relief formation on a surface thereof facing said internal surface of the housing to space same from said internal surface and to permit the enlargement or reduction of said outlet control chamber upon the deformation of the elastomeric member in response to said flow.

2. The emitter according to claim 1, wherein said relief formation integrally formed in said embossed elastomeric member includes a plurality of ribs engageable with said internal surface of the housing and defining therewith said labyrinth flow path.

3. The emitter according to claim 1, wherein said relief formation integrally formed in said embossed elastomeric member includes an annular rib engageable with said internal surface of the housing and defining, therewith said outlet control chamber.

4. The emitter according to claim 1, wherein said housing is fixable to a water supply tube having a discharge port, with said inlet of the housing communicating with the interior of the water supply tube, and the outlet of the housing communicating with said discharge port.

5. The emitter according to claim 4, wherein said housing is formed with a cavity communicating with said outlet, one side of said embossed elastomeric member being fixed within said cavity to define an outlet control chamber communicating with said discharge port via said outlet of the housing, the opposite side of said embossed elastomeric member communicating with the interior of the water supply tube.

6. The emitter according to claim 5, wherein said relief formation on the embossed elastomeric member includes an annular rib formed around the periphery of the embossed elastomeric member on said one side and deflectable firmly against the side wall of the cavity in order to seal the outlet control chamber from the interior of said water supply tube.

7. The emitter according to claim 6, wherein said side wall of the cavity is formed with an annular recess in the end thereof facing the interior of said water supply tube, said annular rib of the embossed elastomeric member being seated in said annular recess.

8. The emitter according to claim 6, wherein said side wall of the cavity is formed with an annular recess in the end thereof facing said outlet control chamber; said embossed elastomeric member being formed with a second annular rib, on the face thereof opposite to that of said first-mentioned annular rib, which second annular rib is seated in said annular recess.

9. The emitter according to claim 1, wherein said housing is fixed to the inner face of a water supply tube and is further formed with ribs engageable with said inner face to define a labyrinth flowpath communicating at one end with said inlet, and at the opposite end with said outlet via said outlet control chamber.

10. The emitter according to claim 1, wherein said housing includes a nipple formed with said inlet and insertable into a discharge port formed in a water supply tube.

11. A drip irrigation emitter comprising:

a water supply tube formed with a plurality of discharge ports; and a dripper element fixed to the inner face of the tube in alignment with each of said discharge ports;

each of said dripper elements comprising a housing including an inlet communicating with the interior of the water supply tube, an outlet communicating with the respective discharge port, and a flow-reducing passageway between said inlet and outlet for reducing the flow of water discharged through the outlet;

said flow-reducer passageway including a labyrinth flow path communicating with said inlet, and an outlet control chamber between said labyrinth flow path and said outlet;

and an elastomeric member fixed within the housing and defining, with an internal surface thereof, a deformable wall of at least said outlet control chamber, which outlet control chamber is automatically enlarged or restricted by deformation of the elastomeric member in response to flow through said outlet control chamber;

said elastomeric member being embossed with an integrally formed relief formation on the surface thereof facing said internal surface of the housing to space same from said internal surface and to permit the enlargement or reduction of said outlet control chamber upon the deformation of the elastomeric member in response to said flow;

said relief formation integrally formed in said embossed elastomeric member including an annular rib on one surface thereof engageable with said internal surface of the housing and defining therewith said outlet control chamber.

12. The emitter according to claim 11, wherein said relief formation integrally formed in said embossed elastomeric member further includes a plurality of ribs engageable with said internal surface of the housing and defining therewith said labyrinth flow path.

13. The emitter according to claim 11, wherein said housing is formed with a cavity communicating with said outlet, said embossed elastomeric member being fixed within said cavity to define on one side thereof, said outlet control chamber communicating with said discharge port via said outlet of the housing, the opposite side of said embossed elastomeric member communicating with the interior of the water supply tube.

14. The emitter according to claim 13, wherein said relief formation on the embossed elastomeric member includes an annular rib formed around the periphery of the embossed elastomeric member on said opposite surface and deflectable firmly against the side wall of the cavity in order to seal the outlet control chamber from the interior of said water supply tube.

15. The emitter according to claim 14, wherein said side wall of the cavity is formed with an annular recess in the end thereof facing the interior of said water supply tube, said annular rib of the embossed elastomeric member being seated in said annular recess.

16. A drip irrigation emitter comprising:

a housing including a nipple formed with an inlet insertable into a discharge port of a water supply tube, an outlet for discharging the water from the housing, and a flow-reducer passageway between said inlet and outlet for reducing the flow of water discharged through the outlet;

said flow-reducer passageway including a labyrinth flow path communicating with said inlet, and an outlet control chamber between said labyrinth flow path and said outlet;

and an elastomeric member fixed within the housing and defining, with an internal surface thereof, a deformable wall of at least said outlet control chamber, which outlet control chamber is automatically enlarged or restricted by deformation of the elastomeric member in response to flow through said outlet control chamber;

said elastomeric member being embossed with an integrally formed relief formation on the surface thereof facing said internal surface of the housing to space same from said internal surface and to permit the enlargement or reduction of said outlet control chamber upon the deformation of the elastomeric member in response to said flow.

* * * * *